Figure 1:
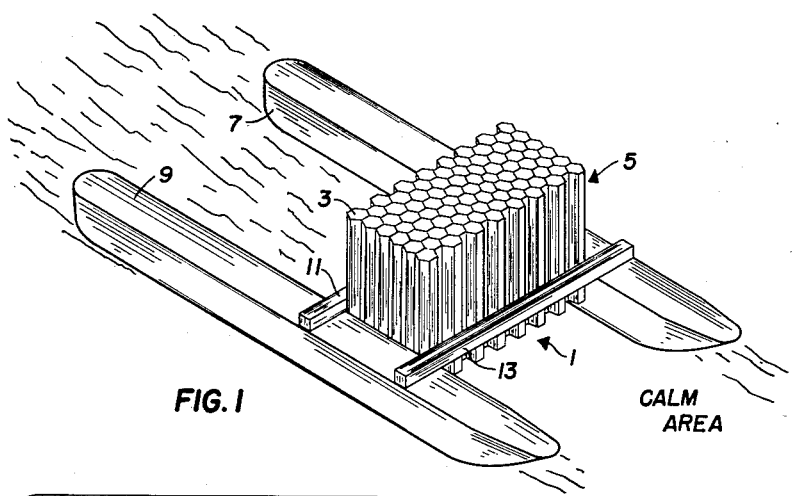

Feb. 21, 1961 R. J. ASKEVOLD 2,972,233
WAVE BREAKING DEVICE
Filed June 11, 1957 d = MAXIMUM WAVE LENGTH

INVENTOR.
ROBERT J. ASKEVOLD
BY
ATTORNEY

United States Patent Office 2,972,233
Patented Feb. 21, 1961

2,972,233
WAVE BREAKING DEVICE

Robert J. Askevold, Crystal Lake, Ill., assignor to The Pure Oil Company, Chicago, Ill., a corporation of Ohio Filed June 11, 1957, Ser. No. 665,088

8 Claims. (Cl. 61—5)

This invention relates to new and useful improvements in wave-breaking devices and more particularly to a wave-breaking device which is operable to retard the vertical motion of waves and thereby to form a calm area behind the device substantially free of wave motion.

In many marine activities, such as the drilling of offshore oil and gas wells, erection of stationary structures, cargo unloading and transfer, etc., work is often interrupted and serious physical damage done by rough seas or heavy swells. In the construction of some offshore installations, work has been retarded as much as 50% due to adverse weather conditions. It has become important, therefore, to develop some means to calm small areas of water to permit work within such an area, in spite of high waves and bad weather conditions.

In some locations where the water is relatively shallow, it is possible to erect fixed physical barriers such as breakwaters and the like which protect limited areas from wave action. In deeper water it is not possible to use fixed barriers and some attempts have been made to use floating barriers of various types to protect against high waves. Floating wave barriers which have been used in the past have always been moved readily by the waves which they were intended to break and have not proved satisfactory for calming high waves sufficiently to permit offshore work during adverse weather conditions.

It is, therefore, one object of this invention to provide a new and improved wave-breaking device which may be used in deep water to protect offshore work installations and the like.

Another object of this invention is to provide an improved wave-breaking device which may be floated on the surface of the water for calming an area of water therebehind to permit work to be carried out in such an area.

A feature of this invention is the provision of a wave-breaking device which includes an improved means for arresting the vertical component of wave motion to prevent passage of waves beyond the device.

Another feature of this invention is the provision of a wave-breaking device which is supported on elongated pontoons and which includes vertically-extending conduits permitting upward motion of water therein and retarding downward motion of water therefrom to prevent the passage of waves beyond the device.

Another feature of this invention is the provision of a wave-breaking device supported on elongated pontoons and having vertically-extending conduits with check valves therein which permit upward movement of water and restrict downward movement of water to remove water from the crest of one wave and discharge same into the following trough of the wave.

Other objects and features of this invention will become apparent from time to time throughout the specifications and claims as hereinafter related.

In the accompanying drawings, to be taken as part of this specification, there is clearly and fully illustrated a preferred embodiment of this invention, in which drawings, Fig. 1 is a view of part of a body of water showing this wave-breaking device positioned therein to calm an area behind the device.

Figure 2:
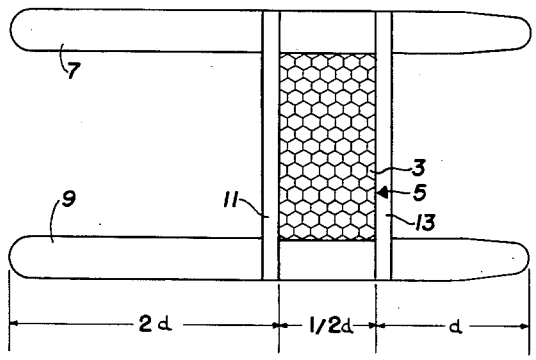
Figure 4:
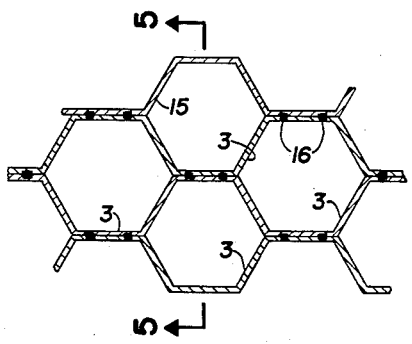
Figure 3:
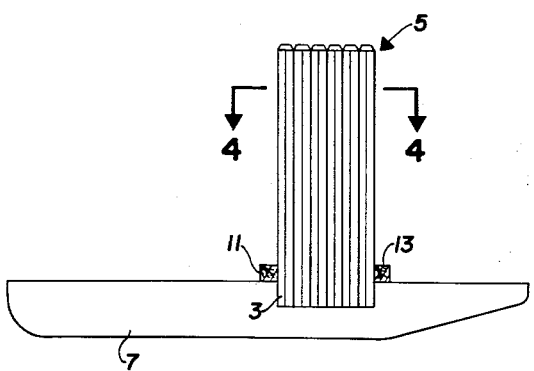
Figure 5:
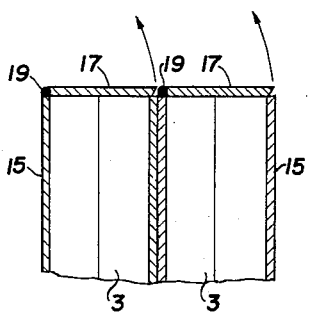

Fig. 2 is a plan view of the wave-breaking device of this invention showing the supporting pontoons and the tops of the wave-breaking conduits, Fig. 3 is a view in section showing one of the supporting pontoons and the vertically-extending bundle of conduits, Fig. 4 is a detail sectional view of part of the vertically-extending conduits, taken on the line 4—4 of Fig. 3, and Fig. 5 is a detail sectional view taken on the line 5—5 of Fig. 4.

This invention consists of a wave-breaking device which includes a plurality of vertically-extending conduits which are arranged to arrest the wave action by damping out the vertical component of wave motion. The conduits are supported in a bundle in a vertically-extending position and are provided with check valves which open on upward movement of water for quick venting of air therefrom and which close to restrict the backflow of air and retard the downward movement of water from the conduits. The vertically-extending bundle of conduits may, if desired, be supported on a fixed support, but are preferably supported on elongated pontoons. The conduits are positioned with the lower ends thereof at about the calm water level and extend above the calm water level for a distance at least half the height of the maximum crest-to-trough of the waves to be broken. The crest of waves passing into this wave-breaking device flow upwardly into the conduits and are restricted in their backflow so that the water therefrom is discharged into a following wave trough and thus cancelling out the vertical component of wave motion and producing a calm water area behind the wave-breaking device.

Referring to the drawings by numerals of reference there is shown in Fig. 1 a portion of the surface of the water of a lake or sea which is very rough and has many high waves. A wave-breaking device 1 is located in this area and held in position by any suitable means, such as an anchor. The waves which flow into the wave-breaking device are substantially reduced in size and almost completely eliminated so that the area immediately behind the wave-breaking device is sufficiently calm to carry out any desired work such as the construction of work platforms for oil or gas wells or other stationary structures.

Wave-breaking device 1 consists of the plurality of vertically-extending wave-breaking conduits 3 which are secured together in a form of conduit bundle 5 supported on horizontally-extending pontoons 7 and 9 by laterally-extending supporting bars 11 and 13. Pontoons 7 and 9 must be of sufficient length to avoid rocking of the device by the waves, and should, therefore, have a length extending into the waves by a distance at least twice as long as the crest-to-crest wave length of the largest waves to be broken by the device, and behind the device by a distance equal to about one wave length.

The vertically-extending wave-breaking conduits 3 are shown in more detail in Figs. 3, 4 and 5 and are preferably formed of sheet metal sections 15 (as shown in Fig. 4) which are corrugated and joined together along adjacent corrugations, as at 16, by rivets, spot welding or the like. At the upper end of each of conduits 3 of the conduit bundle 5 there is positioned a check valve 17, which is pivotally connected, as at 19, by a suitable hinge connection, and is operable to open upwardly as indicated by the diretcional arrows to vent air from the conduits and to close and prevent backflow of air into the conduits.

The conduit bundle 5 is supported on horizontal supporting members 11 and 13 with the bottom end thereof at about the calm water level. The length of conduits 3 is equal to at least the height above the calm water level of the crest of the largest waves to be broken. The depth or thickness of the bundle of conduits in the direction of wave motion is at least one-half of the wave length of the largest waves to be broken, but preferably a thickness greater than this.

When this device is anchored with the long ends of pontoons 7 and 9 facing into the waves, the crest of oncoming waves will flow upwardly into conduits 3. Check valves 17 at the upper ends of conduits 3 will open and permit quick venting of air therefrom. As the crest of the wave passes the device, the downflow of water from conduits 3 is retarded by closed check valves 17, preventing flow of air into the conduits. The water in conduits 3 will discharge as the wave trough uncovers the bottom of each conduit, permitting air to flow up and displace water which will fill the trough of the wave immediately preceding it, thus cancelling out the wave motion and producing a calm area behind it.

As is seen from the foregoing description, the size and proportions of this wave-breaking device must be varied according to the specific situations in which the device is to be used. Thus, a larger device is required for the breaking and calming of large ocean waves than is required for the breaking and calming of the waves of an inland lake or sea. If it is desired to calm an area of rough sea 100 ft. wide, where the waves have crest-to-crest distances of 60 ft. and crest-to-trough distances of 12 ft., the following dimensions are required for this wave-breaking device. The length of supporting pontoons 7 and 9 is equal to three and one-half wave lengths, or 210 ft. The bundle of conduits 3 is 100 ft. long, measured from pontoon to pontoon, and one-half wave length, 30 ft., in depth. The height of conduits 3 is one-half the crest-to-trough height of the waves, or 6 ft. The diameter of the individual conduits 3 may vary from 1% to 10% of the length of those conduits and, for this particular installation, is about 3 inches. The buoyant volume of pontoons 7 and 9 (i.e., the volume above the water level when the device is empty of water) should exceed five times the volume of the bundle or honeycomb of conduits 3 in order to prevent appreciable change in level of the device when filled with water. For the device being described, the freeboard volume or buoyant volume of pontoons above the water line should be at least 90,000 cubic feet. Wherever distances are expressed as multiple of wave lengths, they are minima and larger dimensions are preferred.

While there has been described only one preferred embodiment of this invention it will be obvious to those skilled in the art that modifications of this invention can be made without departing from the scope of intended coverage of the invention as defined in the appended claims. The device has been described with particular emphasis placed upon its construction as a floating structure. It will be obvious to those skilled in the art that the basic wave-breaking arrangement may be used equally well in conjunction with a fixed supporting arrangement having suitable means to vary the position of the wave-breaking conduit bundle according to changes in water level due to changes in the tide and changes in direction of wave motion because of changes in the wind. Also, it is obvious that the conduits may have configurations other than the hexagonal illustrated, e.g., round, oval, square, octagonal, triangular, etc.

What is claimed is:

1. A wave-breaking device comprising a plurality of conduits secured together as a bundle, means for supporting said conduit bundle over the water with the conduits extending vertically and with the lower ends of the conduits at about the calm water level so that water from the crest of waves passing thereunder flows upward into said conduits, and upwardly-acting check valves at the upper ends of said conduits, providing quick venting of air therefrom and restricting backflow of air, to retard the discharge of water from said conduits and reduce substantially the height of waves passing through the device.

2. A wave-breaking device as defined in claim 1 in which said conduits are formed of sheet metal bent in corrugated form and joined together at adjacent corrugations to form a structure having vertically-extending passages.

3. A wave-breaking device as defined in claim 2 in which the vertically disposed conduits extend above the calm water level by a distance at least as great as the maximum crest of waves to be broken.

4. A wave-breaking device as defined in claim 3 in which the bundle of conduits has a thickness in the direction of wave motion which is at least the distance of one-half of the wave length of the maximum wave to be broken.

5. A wave-breaking device comprising a plurality of conduits secured together in a bundle, a pair of elongated pontoons secured to said conduit bundle to support the same over the water with the conduits extending vertically and with the lower ends of the conduits at about the water line of said pontoons so that water from the crest of waves passing thereunder flows upward into said conduits, said conduit bundle being supported outboard of said pontoons, said pontoons being of sufficient length to prevent any substantial rocking motion of the device by waves passing thereabout, and upwardly-acting check valves at the upper ends of said conduits, providing quick venting of air therefrom and restricting backflow of air, to retard the discharge of water from said conduits and reduce substantially the height of waves passing through the device.

6. A wave-breaking device as defined in claim 5 in which the conduits are formed of sheet metal bent in corrugated form and joined together along adjacent corrugations to form a bundle having vertically-extending passages.

7. A wave-breaking device as defined in claim 6 in which said conduit bundle has a vertical height above the calm water level at least as great as the maximum crest of waves to be broken.

8. The wave-breaking device as defined in claim 7 in which the thickness of the conduit bundle in the direction of wave motion is at least one-half of the wave length of the maximum wave to be broken, the diameter of the vertically-extending conduits is about 1% to 10% of the vertical height thereof, and the pontoons extend forward of the conduit bundle by a distance of at least two wave lengths of the maximum waves to be broken and behind the conduit bundle by a distance of about one wave length, and have a freeboard buoyant volume at least five times the total volume of the vertically-extending conduits.

References Cited in the file of this patent

UNITED STATES PATENTS

| | | |
|---|---|---|
| 674,958 | Caffey | May 28, 1901 |
| 973,022 | Fitzpatrick | Oct. 18, 1910 |
| 1,397,025 | White | Nov. 15, 1921 |
| 2,609,068 | Pajak | Sept. 2, 1952 |
| 2,694,358 | Taylor | Nov. 16, 1954 |
| 2,729,429 | Goemann | Jan. 3, 1956 |
| 2,772,757 | Hammond | Dec. 4, 1956 |
| 2,886,951 | Valembois | May 19, 1959 |

FOREIGN PATENTS

| | | |
|---|---|---|
| 2,494 | Great Britain | 1858 |
| 1,049,067 | France | 1953 |